(No Model.) 3 Sheets—Sheet 1.
R. McCULLY.
CRUSHING MACHINE.
No. 348,758. Patented Sept. 7, 1886.
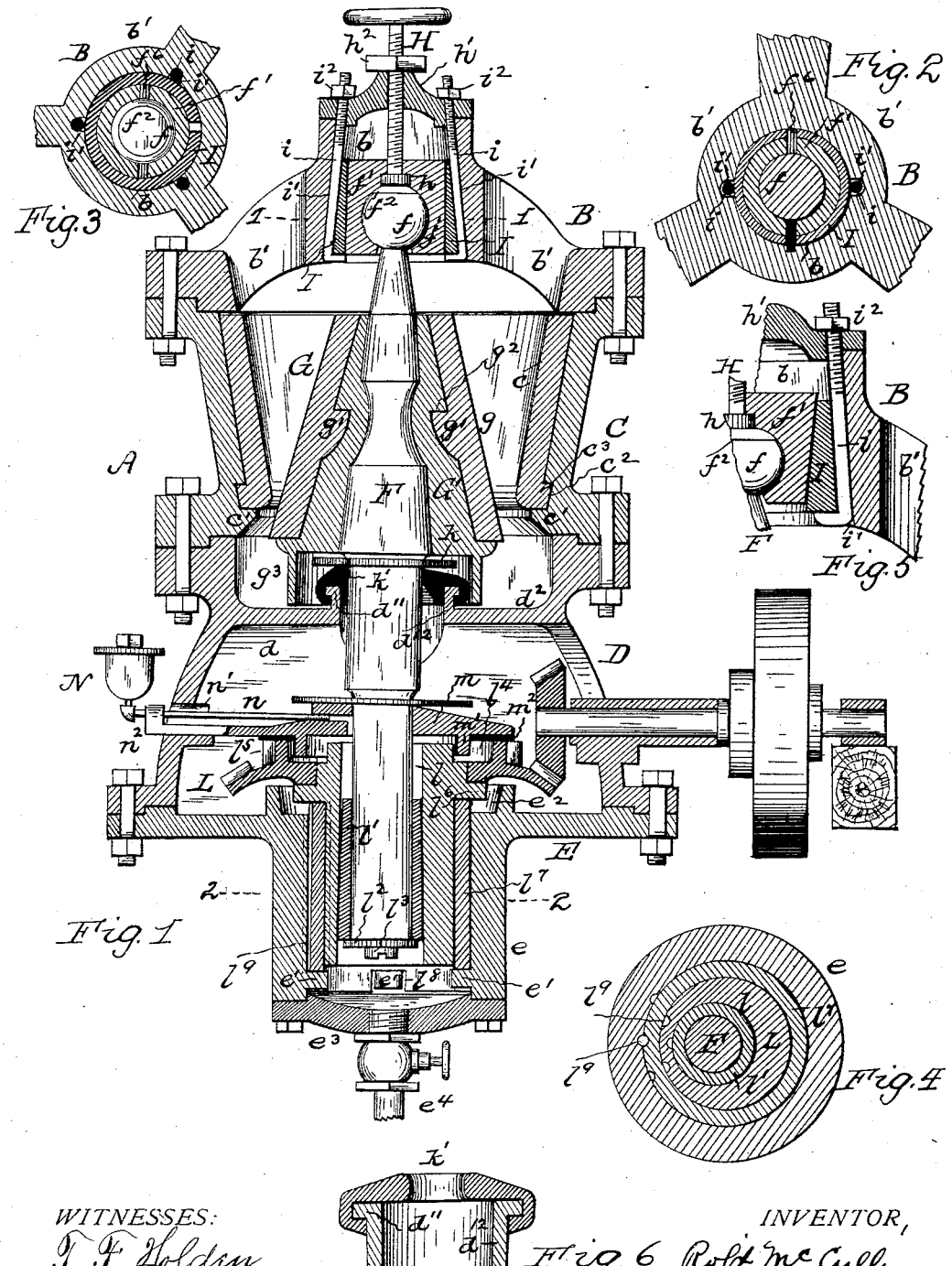
WITNESSES:
T. F. Holden
Geo. R. Byington
INVENTOR,
Robt McCully
By S. J. VanStavoren
ATTORNEY (No Model.)  3 Sheets—Sheet 2.

R. McCULLY.
CRUSHING MACHINE.

No. 348,758.  Patented Sept. 7, 1886.

WITNESSES.
T. F. Holden
Geo. R. Byington

INVENTOR,
Robt. McCully
By S. F. Van Stavoren
ATTORNEY

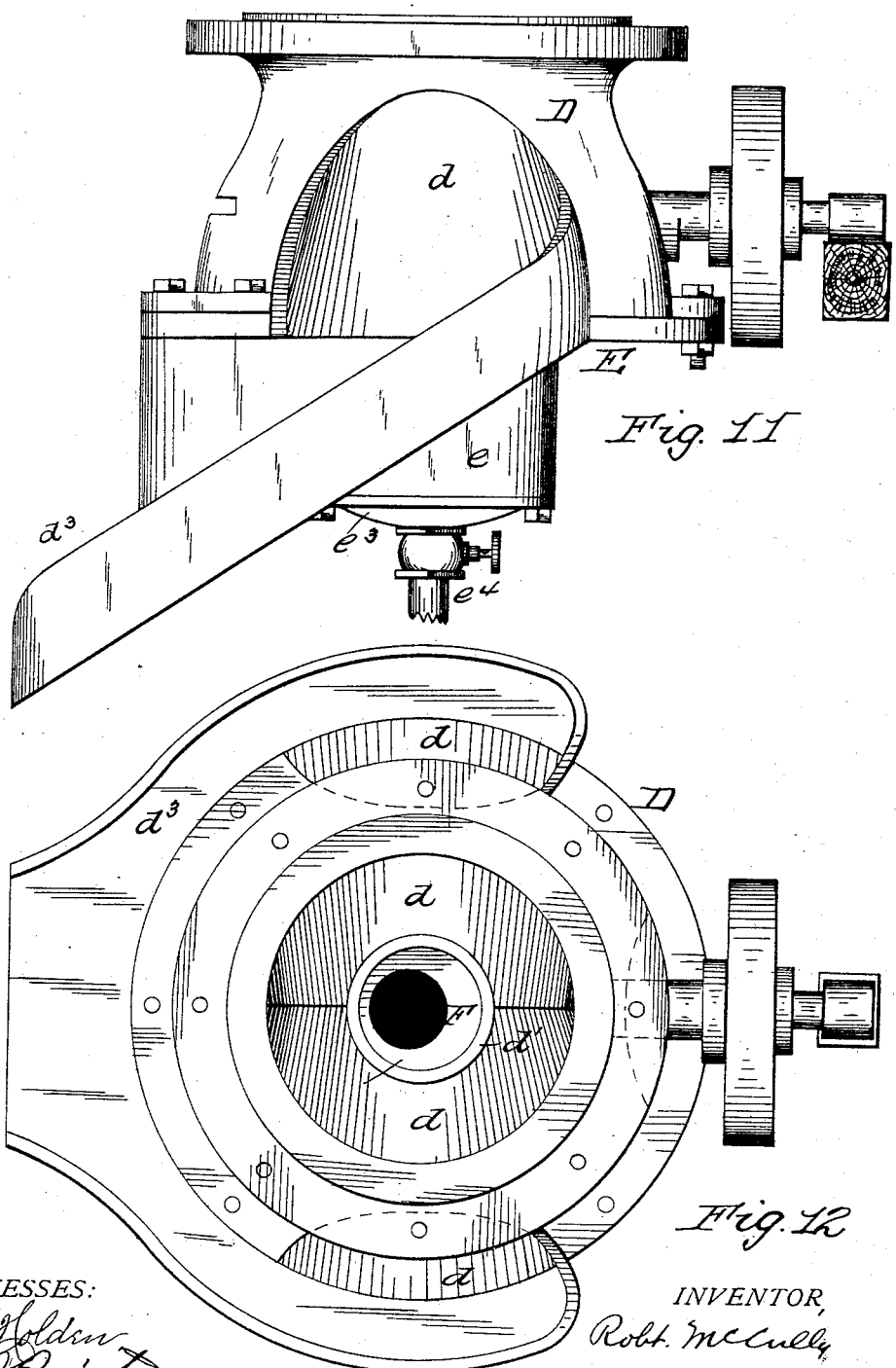

UNITED STATES PATENT OFFICE.

ROBERT McCULLY, OF PHILADELPHIA, PENNSYLVANIA.

CRUSHING-MACHINE.

SPECIFICATION forming part of Letters Patent No. 348,758, dated September 7, 1886.

Application filed August 4, 1885. Serial No. 172,536. (No model.)

*To all whom it may concern:*

Be it known that I, ROBERT McCULLY, a citizen of the United States, residing at Philadelphia, in the county of Philadelphia and State of Pennsylvania, have invented certain new and useful Improvements in Crushing-Machines, of which the following is a specification, reference being had therein to the accompanying drawings, wherein—

Figure 7:
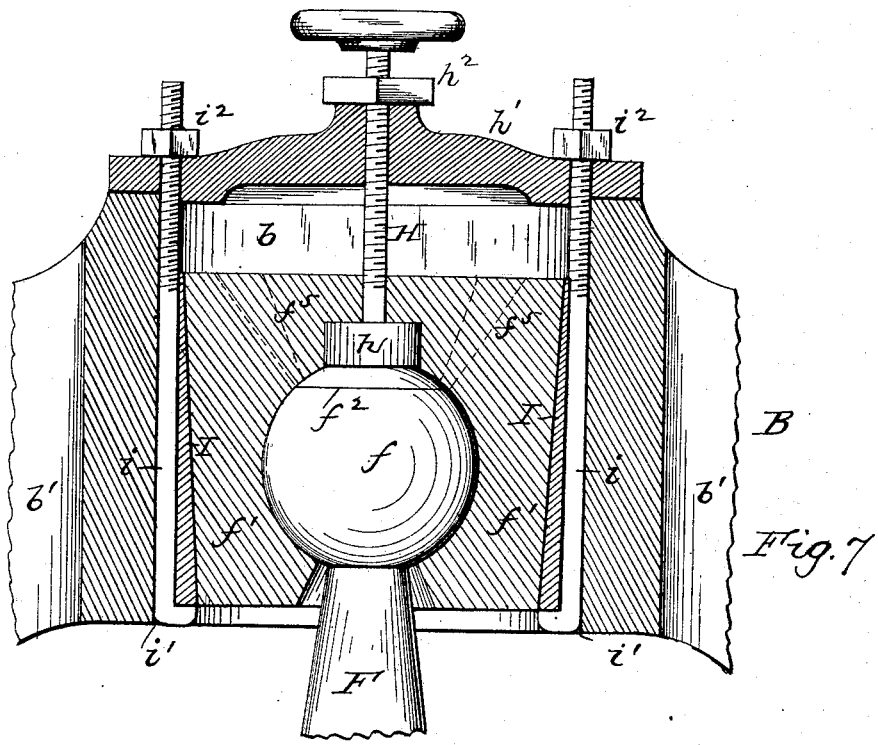
Figure 8:
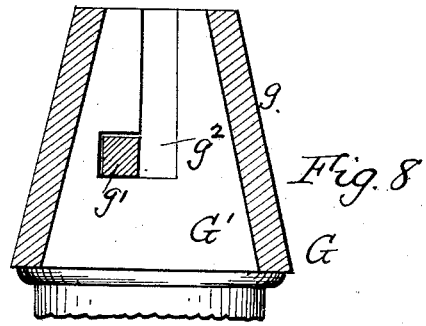
Figure 9:
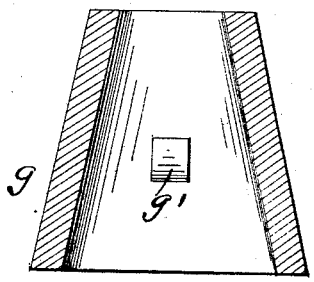
Figure 10:
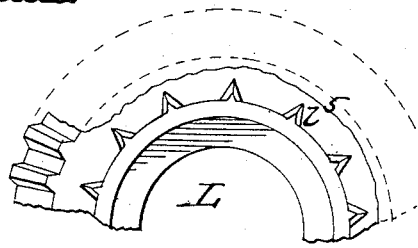

Figure 1 is a vertical section, partly in elevation, of a crushing-machine having an eccentrically-gyrating shaft, showing my improvements. Fig. 2 is a detail section on line 1 1, Fig. 1. Fig. 3 is a like view showing modification of construction illustrated in Fig. 2. Fig. 4 is section on line 2 2, Fig. 1. Fig. 5 is a detail section, partly in elevation, showing modification of rings or sections for taking up the wear of the shaft's ball-fulcrum and its bearings or boxes. Fig. 6 is a detail section of flanged opening in top of chute-chamber, showing flexible washer or cover therefor. Fig. 7 is a detail sectional view, partly in elevation, of a portion of the head or top section of the frame of the machine, drawn to an enlarged scale, showing modified form of mechanism for taking up the wear of the ball-fulcrum of the shaft and boxes or bearings therefor. Fig. 8 is a detail sectional view, partly in elevation, showing mode of attachment of the crushing-faces to the body of the crusher-head. Fig. 9 is a vertical section through the crusher-head faces. Fig. 10 is a plan of a portion of driving-wheel for the gyrating shaft. Fig. 11 is a side elevation of the lower part of the machine, showing a common outlet or way connecting the chutes of the machine, and Fig. 12 is a plan of same.

My invention has relation to crushing-machines having an eccentrically-gyrating shaft, which is wholly supported and it and the crusher-head adjusted from the top of the machine, as fully described in an application filed of even date herewith, Serial No. 173,535, and it has for its object the construction of parts for enhancing the durability and efficiency of the machine.

My invention accordingly consists of the combination, construction, and arrangement of parts as hereinafter described and claimed, having reference particularly to a gyrating shaft having a ball-fulcrum connected to a single supporting and adjusting screw, boxes for said fulcrum, and a sectional ring and adjusting mechanism for taking up the wear of the ball-fulcrum, and its bearing, to securing the faces of the crusher-head to its body by means of projections formed on one and fitting into L-shaped slots on the other of said parts, to securing the crushing-faces of the crushing-chamber to its walls by means of a bottom outside rib on said faces fitting into a recess in the walls of said chamber, to a common way or conveyer for the two chutes of the machine, and to the specific construction of the driving-gear for the gyrating shaft and devices for oiling the same.

In the drawings, A represents the frame of the machine, composed of a head or top plate, B, having central opening, $b$, and surrounding radial or feed openings $b'$; C, the crushing-chamber; D, the chute or outlet chamber, and E the bottom plate or section, all flange-bolted, as shown, or they may be otherwise secured together, as desired.

F represents the gyrating shaft having ball-fulcrum $f$ in boxes or bearings $f'$, sliding in opening $b$. The top of the ball is preferably cut off or made flat, as shown at $f^2$, and in the adjacent parts of the boxes $f'$ is inserted a disk or flange, $h$, formed or secured to the lower end of screw H, which supports said boxes and shaft, and by means of which they are raised or lowered to adjust the crusher-head G for varying the fineness of the crushing or for taking up the wear of the crushing-faces. This screw H engages with a threaded opening in an arched or other shaped cap or cover, $h'$, for opening $b$, and has a jam or set nut, $h^2$.

Between the sides of the boxes $f'$ and opening $b$ are inserted semicircular rings I of wedge shape in cross-section. These rings I are supported upon the heads of bolts $i$, placed in recesses $i'$ in the walls of opening $b$. (Seen more plainly in Fig. 2.) These bolts $i$ run up through openings in cap $h'$, and are provided with set-nuts $i^2$. By adjusting these nuts $i^2$ the ring-sections are drawn upward between boxes $f'$ and the walls of opening $b$, to cause the boxes to come together and take up any wear of the same. The sloping or inclined sides of the ring-sections I may be the outside surfaces, as shown in Fig. 1, in which case the bolts I will run parallel to said sloping sides. If the latter are upon the inside of ring-sections I, as shown in Fig. 7, the bolts are in a perpendicular position, and the contiguous sides of the boxes are reversely inclined, as illustrated. I prefer this construction, as it will support all the weight, or nearly so, without strain on any of the boxes or screws at the top of the machine.

In Fig. 5 both sides of the ring-sections are shown sloping, and in this case the contiguous sides of the boxes $f'$ are reversely inclined, and the bolts $i$ are set at an angle to the perpendicular.

The ring-sections I and their supporting-bolts $i$ not only serve to take up the wear of boxes $f'$, but also assist to support the shaft F and the crusher-head G. The entire weight of the same does not, therefore, fall wholly upon screw H, but is divided between it and bolts $i$.

The crushing-faces $c$ for chamber C are supported upon a bottom inside ledge or shoulder, $c'$, the upper edge of which forms part of or runs into an annular recess, $c^2$, for the reception of flanges or ribs $c^3$ on the faces $c$, which flanges prevent said faces rising in chamber C during the crushing operation, and avoids straining of the joint between the top plate, B, and chamber C, and consequent loosening of their connecting-bolts. The faces $g$ of crusher-head G are secured to the shaft-sleeve G' by means of projections $g'$ entering L-shaped slots $g^2$, (see more plainly Figs. 8 and 9,) and by pouring molten metal between the same, after the faces have been turned to cause the projections $g'$ to pass into the lower or horizontal limbs of slots $g^2$. These crushing-faces may be respectively made in one piece or comprise a series of staves or pieces.

The sleeve G' has a bottom depending flange, $g^3$, which incloses a metal washer, $k$, loose on shaft F, and a flexible gasket or washer, $k'$, suitably slipped over a bead, $d^{11}$, on a flange, $d^{12}$, projecting from the top of chamber D or its chutes $d$ $d$. This flange $d^{12}$ surrounds the shaft-opening in said top, and the washers or gaskets $k$ $k'$ form a dust-shield to exclude dust and dirt from chamber D.

The driving-wheel L for shaft F has the usual eccentric bore, $l$, for sleeve $l'$. The latter is held upon the shaft F by a washer, $l^2$, and screw $l^3$. Upon the upper side of wheel L is a gutter, $l^4$, and outside of this gutter is a series of angular-shaped projections or blades, $l^5$. Upon the under side of wheel L is a shoulder, $l^6$, which rests upon the top edge of a sleeve, $l^7$, inserted in bearing or box $e$, depending from plate E. The sleeve $l^7$ is notched at its lower edge, as shown at $l^8$, to receive lugs $e'$, projecting from the inner side of bearing $e$, which lugs and notches support the sleeve $l^7$, and consequently the wheel L in position, and prevent the sleeve from turning with said wheel. Upon the upper side of the plate E, and surrounding the wheel-shoulder $l^6$, is a gutter, $e^2$. The bottom of bearing $e$ is closed by a cap or cover, $e^3$, having a valved drain-pipe, $e^4$. Upon the top of gutter $l^4$, on wheel L, rests a washer or disk, $m$, having a flange, $m'$, which dips into said gutter, and between said washer and edge of the gutter is preferably interposed a packing or flexible gasket, $m^2$. The disk or washer $m$ is of such diameter that it extends to and beyond, if desired, the wheel-blades $l^5$, and has a pipe-connection, $n$, passing through side opening, $n'$, in chamber D, with an oil-cup, N. The latter and pipe $n$ are preferably supported upon a radial bar, $n^2$, extending from disk or washer $m$.

The oil from cup N passes first to bore $l$ of wheel L, thence down between said bore and sleeve $l'$, and thence up between outside of hub of wheel L and sleeve $l^7$, and overflows into gutter $e^2$. When this occurs, the oil-supply is cut off. The flow of oil through or between the sleeves $l'$ $l^7$ and hub of wheel L is facilitated by forming vertical grooves $l^9$ in the sides of said parts, as plainly illustrated in Fig. 4.

The gummy or thick oil collecting in the bottom of bore $l$ is from time to time drained away through cock $e^4$.

As the wheel L revolves, its blades $l^5$ churn the air about the edge or periphery of washer $m$, and exclude dust or dirt tending to gain access to the bearings and eccentric of wheel L.

The chutes $d$ are constructed as shown, or comprise two oppositely-arranged chutes having a sharp or angular meeting ridge, $d^2$, which extends diametrically across or forms the top of chamber D, as more plainly shown in Fig. 1. These chutes are connected by or have an outside spout, $d^3$, common to both of them, as seen more plainly in Figs. 11 and 12.

The flexible gasket $k'$ may be made in any suitable manner, or as described in a pending application of an even date herewith, Serial No. 173,537; but to make it hug the shaft F, and at the same time yield readily to its gyratory movement, I prefer to make it thinner in cross-section at or near its edges and thick at its eye or middle, as shown in Fig. 6.

If desired, oil-channels may be formed in boxes $f'$, as illustrated by dotted lines $f^5$, Fig. 7, and the boxes and rings are held apart vertically by filling or packing plates $f^6$, (see Figs. 2 and 3,) any one of which is removed as the screws or bolts $i$ are adjusted to take up the wear of said boxes.

What I claim is—

1. In a crushing-machine, an eccentrically-gyrating shaft having a ball-fulcrum, sliding boxes for the fulcrum, a supporting and adjusting screw for said shaft and boxes, and means, substantially as described, for taking up the wear of said fulcrum and boxes, and for sustaining the weight and pressure of the crusher-head and its shaft.

2. In a crushing-machine, the combination of shaft F, having ball-fulcrum $f$, the boxes $f'$, having screw H, cap $h'$, ring-sections I, wedge-shaped in cross-section, and bolts $i$, substantially as shown and described.

3. In a crushing-machine, the shaft F, having crusher-head G, composed of sleeve G' and facing $g$, united by lugs $g'$ on said facing, entering L-shaped slots formed in said sleeve, substantially as shown and described.

4. In a crushing-machine, the combination of annular crushing-chamber C, having inside shoulder, $c'$, running into or forming part of an annular groove, $c^2$, correspondingly-shaped facings $c$, having outside ribs or flanges, $c^3$, fitting into said groove, and the top plate, B, substantially as shown and described.

5. In a crushing-machine, the combination of gyrating shaft F, crushing-chamber C, chamber D, provided with upwardly-projecting flange, opening $d^{12}$, having bead $d^{11}$, and gasket or washer $k'$, having its greatest vertical thickness at its middle, and washer $k$, substantially as shown and described.

6. The combination, in a crushing-machine having a gyrating shaft and suitable crushing-chamber, of chamber D, provided with shaft-opening, flange $d^{12}$, having bead $d^{11}$, and flexible gasket or washer $k'$, of unequal width in cross-section, substantially as shown and described.

7. In a crushing-machine, the combination of a suitable crushing-chamber, a gyratory shaft, F, having a crusher-head, eccentric driving-gear L, having gutter $l^4$, washer $m$, loose on said shaft, and having depending flange $m'$, extension $n^2$, oil-pipe $n$, and cup N, substantially as shown and described.

8. In combination with shaft F, sleeve $l'$, wheel L, having eccentric bore $l$ and shoulder $l^6$, the sleeve $l^7$, having notches $l^8$, and bearing $e$, having lugs $e'$, adapted to said notches, substantially as shown and described.

9. In combination with shaft F, sleeve $l'$, wheel L, having eccentric bore $l$ and shoulder $l^6$, the sleeve $l^7$, having notches $l^8$, adapted to lugs $e'$ in bearing $e$, and vertical grooves formed in said bearing, sleeves, and hub of wheel L, substantially as shown and described.

10. In a crushing-machine, the chamber D, having oppositely-located chutes $d$ $d$, connected by an outside spout, $d^3$, substantially as shown and described.

In testimony whereof I affix my signature in presence of two witnesses.

ROBERT McCULLY.

Witnesses:
S. J. VAN STAVOREN,
CHAS. F. VAN HORN.